(12) United States Patent
Ma et al.

(10) Patent No.: US 7,390,536 B2
(45) Date of Patent: *Jun. 24, 2008

(54) METHOD FOR FABRICATING COMPOSITE GAS SEPARATION MODULES

(75) Inventors: Yi Hua Ma, Worcester, MA (US); Ivan P. Mardilovich, Worcester, MA (US); Erik E. Engwall, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/804,847

(22) Filed: Mar. 19, 2004

(65) Prior Publication Data

US 2004/0237780 A1 Dec. 2, 2004

Related U.S. Application Data

(60) Provisional application No. 60/456,930, filed on Mar. 21, 2003.

(51) Int. Cl.
*B05D 3/12* (2006.01)
*B01D 53/00* (2006.01)

(52) U.S. Cl. .................. 427/402; 427/404; 427/419.1; 427/355; 427/270; 427/383.1; 427/255.28; 427/421.1; 427/446; 427/455; 427/595

(58) Field of Classification Search .................. None
See application file for complete search history.

(56) References Cited

U.S. PATENT DOCUMENTS

| | | | |
|---|---|---|---|
| 2,958,391 A | 11/1960 | deRosset |
| 3,241,298 A | 3/1966 | Pierce |
| 3,413,777 A | 12/1968 | Langley et al. |
| 3,428,476 A | 2/1969 | Langley et al. |
| 3,717,525 A | 2/1973 | Bültemann |
| 4,496,373 A | 1/1985 | Behr et al. |
| 4,589,891 A | 5/1986 | Iniotakis et al. |
| 4,689,150 A | 8/1987 | Abe et al. |
| 4,699,637 A | 10/1987 | Iniotakis et al. |
| 4,857,080 A | 8/1989 | Baker et al. |
| 5,049,167 A | 9/1991 | Castro et al. |
| 5,139,541 A | 8/1992 | Edlund |
| 5,205,841 A | 4/1993 | Vaiman |
| 5,215,729 A | 6/1993 | Buxbaum |
| 5,217,506 A | 6/1993 | Edlund et al. |
| 5,258,339 A | 11/1993 | Ma et al. |
| 5,259,870 A | 11/1993 | Edlund |
| 5,358,553 A | 10/1994 | Najjar et al. |
| 5,393,325 A | 2/1995 | Edlund |
| 5,449,848 A | 9/1995 | Itoh |
| 5,451,386 A | 9/1995 | Collins et al. |
| 5,498,278 A | 3/1996 | Edlund |
| 5,614,001 A | 3/1997 | Kosaka et al. |
| 5,652,020 A | 7/1997 | Collins et al. |
| 5,672,388 A | 9/1997 | McHenry et al. |
| 5,738,708 A | 4/1998 | Peachey et al. |
| 5,782,959 A | 7/1998 | Yang et al. |
| 5,782,960 A | 7/1998 | Ogawa et al. |
| 5,895,769 A | 4/1999 | Lai |
| 5,904,754 A | 5/1999 | Juda et al. |
| 6,086,729 A | 7/2000 | Bredesen et al. |
| 6,152,987 A | 11/2000 | Ma et al. |
| 6,152,995 A | 11/2000 | Edlund |
| 6,183,542 B1 | 2/2001 | Bossard |
| 6,267,801 B1 | 7/2001 | Baake et al. |
| 6,309,546 B1 | 10/2001 | Herrmann et al. |
| 6,372,363 B1 | 4/2002 | Krueger |
| 6,379,524 B1 | 4/2002 | Lee et al. |

(Continued)

FOREIGN PATENT DOCUMENTS

EP 1 180 392 A1 2/2002

(Continued)

OTHER PUBLICATIONS

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

(Continued)

*Primary Examiner*—William P. Fletcher, III
(74) *Attorney, Agent, or Firm*—Hamilton, Brook, Smith & Reynolds, P.C.

(57) ABSTRACT

The present invention relates to a method for fabricating a composite gas separation module and to gas separation modules formed by the method. In one embodiment, the method for fabricating a composite gas separation module includes depositing a first material on a porous substrate, thereby forming a coated substrate. The coated substrate is abraded, thereby forming a polished substrate. A second material is then deposited on the polished substrate. The first material, the second material, or both the first material and the second material can include a gas-selective material such as a hydrogen-selective metal, e.g., palladium, or an alloy thereof. In one embodiment, the method includes the step of forming a dense gas-selective membrane over the porous substrate. The present invention also relates to a method for selectively separating hydrogen gas from a hydrogen gas-containing gaseous stream.

30 Claims, 1 Drawing Sheet

U.S. PATENT DOCUMENTS

| | | | |
|---|---|---|---|
| 6,419,728 | B1 | 7/2002 | Edlund |
| 6,475,268 | B2 | 11/2002 | Thornton |
| 6,547,858 | B1 | 4/2003 | Edlund et al. |
| 6,596,057 | B2 | 7/2003 | Edlund et al. |
| 6,730,145 | B1 | 5/2004 | Li |
| 6,916,454 | B2 | 7/2005 | Alvin |
| 6,964,697 | B2 | 11/2005 | Pan et al. |
| 7,018,446 | B2 | 3/2006 | Alvin et al. |
| 2002/0083829 | A1 | 7/2002 | Edlund et al. |
| 2003/0183080 | A1 | 10/2003 | Mundschau |
| 2003/0190486 | A1 | 10/2003 | Roa et al. |
| 2003/0213365 | A1 | 11/2003 | Jantsch et al. |
| 2004/0037962 | A1 | 2/2004 | Uemura et al. |
| 2004/0244589 | A1 | 12/2004 | Bossard et al. |
| 2005/0072304 | A1 | 4/2005 | Etievant et al. |
| 2006/0188737 | A1 | 8/2006 | Roa et al. |

FOREIGN PATENT DOCUMENTS

| | | | |
|---|---|---|---|
| EP | 1 208 904 A1 | | 5/2002 |
| EP | 1 277 512 A1 | | 1/2003 |
| EP | 1 208 904 A1 | * | 5/2007 |
| JP | 5085702 | | 4/1993 |
| JP | 05-123548 | | 5/1993 |
| JP | 10-028850 A | | 2/1998 |
| WO | WO 99/33545 A1 | | 7/1999 |
| WO | WO 02/066144 A2 | | 8/2002 |
| WO | WO 03/011433 A1 | | 2/2003 |
| WO | WO 2005/075060 A1 | | 8/2005 |

OTHER PUBLICATIONS

Gryaznov, V. M., et al., "Preparation and catalysis over Palladium Composite Membranes," *Applied Catalysis A: General*, 96:15-23 (1993).

Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).

Ma, Y. H., et al., "Thin Composite Palladium and Palladium/Alloy Membranes for Hydrogen Separation," *Ann. N.Y. Acad. Sci.*, 984:346 (2003).

Mardilovich, I. P., et al., "Dependence of Hydrogen Flux on The Pore Size and Plating Surface Topology of Asymmetric Pd-Porous Stainless Steel Membranes," *Desalination*, 144:85-89 (2002).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Roa, F., "Preparation and Characterization of Pd-Cu Composite Membranes for Hydrogen Separation," *Chem. Eng. J.*, 93:11 (2003).

Roa, F., et al., "The Influence of Alloy Composition on The $H_2$ Flux of Composite Pd-Cu Membranes," *Desalination*, 147:411-416 (2002).

Shu, J., et al., "Structurally Stable Pd-Ag Alloy Membranes: Introduction of a Diffusion Barrier," *Thin Solid Films*, 286:72-79 (1996).

\* cited by examiner

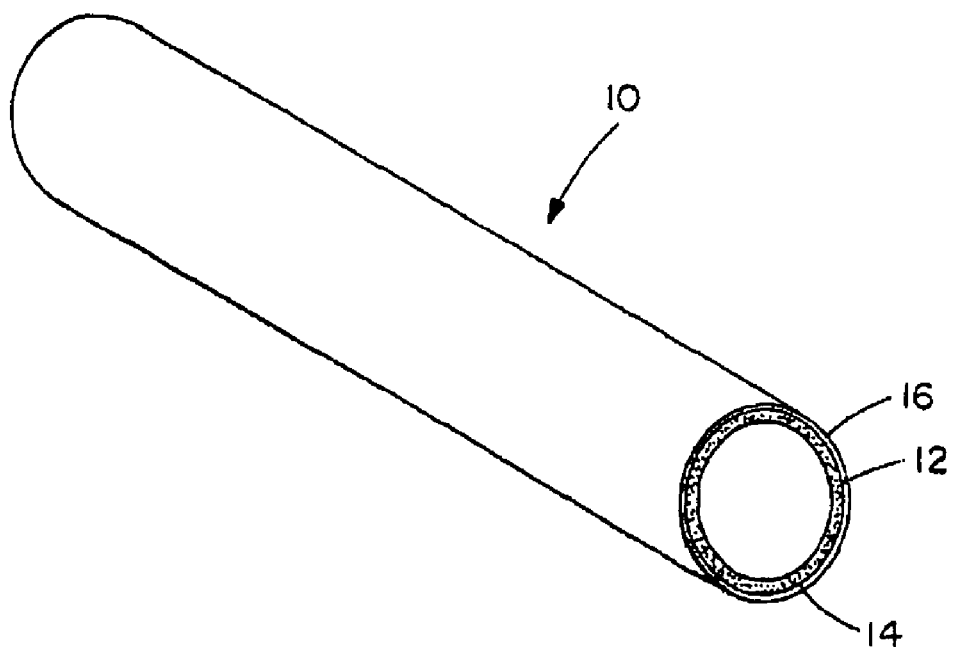

METHOD FOR FABRICATING COMPOSITE GAS SEPARATION MODULES

RELATED APPLICATION

This application claims the benefit of U.S. Provisional Application No. 60/456,930, filed on Mar. 21, 2003. The entire teachings of the above application are incorporated herein by reference.

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate. Alternatively, a gas separation module can be formed purely of a hydrogen-selective metal such as palladium. However, such a module can be very expensive to produce and can lack the mechanical strength that can be required for high pressure and/or high temperature applications.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

Typical hydrogen-selective metal membranes used in composite gas separation modules must be free of defects and/or pinholes that breach the metal layer to prevent the migration of undesired gases through the metal membrane. However, thick hydrogen-selective metal membranes, e.g., palladium membranes, generally are very expensive. In addition, the use of thick membranes to separate gas mixtures usually results in low fluxes of gas(es).

Therefore, a need exists for composite gas separation modules (and methods for their fabrication) that overcome or minimize the above-referenced problems.

SUMMARY OF THE INVENTION

The present invention relates to a method for fabricating a composite gas separation module and to gas separation modules formed by the method. The present invention also relates to a method for selectively separating hydrogen gas from a hydrogen gas-containing gaseous stream.

In one embodiment, the method for fabricating a composite gas separation module includes depositing a first material on a porous substrate, thereby forming a coated substrate. The coated substrate is abraded, thereby forming a polished substrate. A second material is then deposited on the polished substrate. The first material, the second material or both the first material and the second material can include a gas-selective material. For example, the gas-selective material can include a hydrogen-selective metal, e.g., palladium, or an alloy thereof. In one embodiment, the method includes the step of forming a dense gas-selective membrane over the porous substrate.

The invention also includes a method for fabricating a plated substrate that includes plating a porous substrate with a first metal, e.g., a hydrogen-selective metal or an alloy thereof, thereby forming a coated substrate; abrading the coated substrate, thereby forming a polished substrate; and plating the polished substrate with a second metal, e.g., a hydrogen-selective metal or an alloy thereof, thereby forming the plated substrate. In one embodiment, plating the polished substrate with the second metal includes forming a dense hydrogen-selective membrane.

The present invention includes a composite gas separation module comprising a porous substrate and a dense gas-selective membrane wherein the thickness of the dense gas-selective membrane is less than about 3 times the diameter of the largest pore of the porous substrate.

In one embodiment, a method for selectively separating hydrogen gas from a hydrogen gas-containing gaseous stream includes directing the hydrogen gas-containing gaseous stream to a composite gas separation module; wherein the composite gas separation module includes a porous substrate and a dense hydrogen-selective membrane, and wherein the thickness of the dense hydrogen-selective membrane is less than about 3 times the diameter of the largest pore of the porous substrate. By this method, hydrogen gas is at least partially partitioned from the gaseous stream by passing through the dense hydrogen-selective membrane. The dense hydrogen-selective metal membrane can be formed of palladium or an alloy thereof.

Practice of the present invention can produce composite gas separation modules that have generally thinner and/or more uniform dense gas-selective membranes than dense gas-selective membranes of conventional composite gas separation modules. For example, composite gas separation modules can be fabricated that have generally thinner and/or more uniform dense hydrogen-selective metal membranes than dense hydrogen-selective metal membranes of conventional composite gas separation modules. In one embodiment, abrasion of the coated substrate removes dendrites or regions wherein the deposited material accumulates in a direction normal to the surface, rather than being deposited substantially uniformly across the surface. Composite gas separation modules having dense gas-selective membranes formed in accordance with the invention can have more uniform deposits of gas-selective materials and thus can have fewer regions in which the gas-selective material is thicker than would otherwise be required to form a dense gas-selective membrane.

The present invention can reduce or eliminate the formation or propagation of unfavorable morphologies in a dense gas-selective membrane. By reducing the formation or propagation of unfavorable morphologies, practice of the invention can require less gas-selective material, e.g., hydrogen-selective metal, to be deposited to form the dense gas-selective membrane, e.g., a dense hydrogen-selective metal membrane. Thus, practice of the present invention can reduce manufacturing costs, e.g., material costs, for fabricating composite gas separation modules as compared to conventional techniques.

Practice of the present invention can also result in the blocking and/or covering of pores, holes and/or defects in forming dense gas-selective membranes. For example, abrasion of the coated substrate can partially or completely block and/or cover pores, holes and/or defects present in the coated substrate. This effect can reduce the thickness of gas-selective material deposition that would be otherwise necessary to form a dense gas-selective membrane.

Since thinner dense gas-selective membranes typically produce higher rates of gas flux during a separation operation, composite gas separation modules produced as described herein can produce higher overall rates of gas flux, e.g., hydrogen flux. Thus, gas separation processes utilizing the composite gas separation modules described herein can achieve higher rates of gas separation than is possible using conventional composite gas separation modules employing thicker or less uniform dense gas-selective membranes.

BRIEF DESCRIPTION OF THE DRAWINGS

The FIGURE is a sectional perspective view of a composite gas separation module as one embodiment of the present invention.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

In one embodiment, the invention includes a method for fabricating a composite gas separation module, comprising the steps of: (a) depositing a first material on a porous substrate, thereby forming a coated substrate; (b) abrading the coated substrate, thereby forming a polished substrate; and (c) depositing a second material on the polished substrate. The first material, the second material, or both the first material and the second material can include a gas-selective material. For example, the gas-selective material can include a hydrogen-selective metal, e.g., palladium, or an alloy thereof. In one embodiment, the method includes the step of forming a dense gas-selective membrane over the porous substrate (e.g., a dense gas-selective membrane is formed to overlie the porous substrate). The present invention also relates to a composite gas separation module produced by this method. Practice of the present invention can produce composite gas separation modules having thinner and/or more uniformly thick dense gas-selective membranes than conventional processes for manufacturing composite gas separation modules.

The composite gas separation modules described herein each include a dense gas-selective membrane such as, for example, a dense hydrogen-selective metal membrane. In one embodiment, the composite gas separation module includes a dense hydrogen-selective metal membrane of palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective metal membrane of palladium, or an alloy thereof, that is substantially free of open pores, holes and defects such as cracks.

The term "support," as used herein, includes a substrate, a surface treated substrate, a coated substrate, or a coated polished substrate upon which a dense gas-selective membrane has been or will be formed. Serving as a support structure, the substrate can enhance the durability and strength of the composite gas separation module.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

In one embodiment, the gas-selective material can include a combination of substances. For example, the invention includes depositing a hydrogen-selective metal and a zeolite on a porous substrate, thereby forming a coated substrate; abrading the coated substrate, thereby forming a polished substrate; and depositing a second material on the polished substrate. In one embodiment, the zeolite used in a combination of substances is gas-selective. In an alternative embodiment, the zeolite used in a combination of substances is not gas-selective, for example, the zeolite used in a combination of substances is not hydrogen-selective.

In one aspect, the coated substrate includes one or more unfavorable morphologies. "Unfavorable morphology," as that term is used herein, refers to a deposit of a gas-selective material which results in the need to make a deposited gas-selective material thicker than otherwise would be needed to form a dense gas-selective membrane than if the unfavorable morphology was abraded, as described herein, or if the unfavorable morphology was not present. The presence of unfavorable morphologies can lead to an increase in the amount of gas-selective material required to achieve a dense gas-selective membrane. For example, the presence of an unfavorable morphology can result in increased thickness of the dense gas-selective membrane in the vicinity of the unfavorable morphology upon deposition of a dense gas-selective membrane component. Examples of unfavorable morphologies can include excessive crystal growth, dendrites, agglomerates, or other structures in directions generally perpendicular to the surface of the substrate. Other examples of unfavorable morphology can include a repetition of porous or powder-like morphologies from previously deposited layers of material.

Specific embodiments of the invention, including the method for fabricating a composite gas separation module, the composite gas separation module formed by the method, the method for fabricating a plated substrate, and the method for selectively separating hydrogen gas from a hydrogen gas-containing gaseous stream follow. Details of method steps employed in various embodiments of the methods for fabrication of a plated substrate and a composite gas separation module, and of optional components of the resulting composite gas separation modules, are described thereafter under separate subheadings.

The FIGURE illustrates cylindrical composite gas separation module 10 as one embodiment of the invention. Composite gas separation module 10 includes porous substrate 12, optional intermediate layer 14, and dense gas-selective membrane 16. As illustrated, intermediate layer 14 and dense gas-selective membrane 16 overlie the outside surface of cylindrical porous substrate 12. In alternative embodiments not illustrated, intermediate layer 14 and dense gas-selective membrane 16 can overlie the interior surface of cylindrical porous substrate 12 (with the dense gas-selective membrane forming the innermost of the three cylindrical layers) or can overlie both the interior and the exterior surfaces of porous substrate 12. In a preferred embodiment, intermediate layer 14 and dense gas-selective membrane 16 overlie only either the interior or the exterior surface of porous substrate 12. The composite gas separation module can take any of a variety of forms including a cylindrical tube, as illustrated in the Figure, or a planar surface.

The present method for fabricating a composite gas separation module includes the step of depositing a first material such as a gas-selective material (e.g., a hydrogen-selective metal) on a porous substrate, thereby forming a coated substrate.

The porous substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTELLOY® alloys (e.g., HASTELLOY® C-22®) (trademarks of Haynes International, Inc., Kokomo, IN) and INCONEL® alloys (e.g., INCONEL® alloy 625) (INCONEL is a trademark of Huntington Alloys Corp., Huntington W. Va.); and ceramics. In one embodiment, the porous metal substrate is an alloy containing chromium and nickel. In an additional embodiment, the alloy contains chromium, nickel and molybdenum such as, for example, HASTELLOY® C-22® or INCONEL® alloy 625. Preferably, the substrate is a porous metal substrate such as, for example, porous stainless steel. Cylinders of porous stainless steel that are suitable for use as substrates are available from Mott Metallurgical Corporation (Farmington, Conn.) and from Pall Corporation (East Hills, N.Y.), for example.

One of ordinary skill in the art can select substrate thickness, porosity, and pore size distribution using techniques known in the art. Desired substrate thickness, porosity, and pore size distribution can be selected based on, among other factors, the operating conditions of the final composite gas separation module such as operating pressure. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. In some embodiments, the mean or median pore size of the substrate can be about 0.1 to about 15 microns, e.g., from about 0.1 to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

In a preferred fabrication method, any contaminants are initially cleaned from the substrate, for example, by treating the substrate with an alkaline solution such as by soaking the substrate in an approximately 60° C. ultrasonic bath for about half an hour. Cleaning is typically followed by rinsing such as, for example, wherein the substrate is sequentially rinsed in tap water, deionized water and isopropanol. Preparation of the porous substrate can also include surface treatment; formation of an intermetallic diffusion barrier; surface activation; and/or deposition of a metal such as palladium, platinum, or gold, as described infra, prior to depositing a gas-selective material on the porous substrate.

In one aspect of the present invention, a first material is deposited on the porous substrate, thereby forming a coated substrate. For example, a gas-selective material can be deposited to form a thin layer of the gas-selective material. In one embodiment, the first material includes a gas-selective material, for example, a hydrogen-selective metal or an alloy thereof such as palladium or an alloy thereof. In some embodiments, the first material does not include a gas-selective material or a hydrogen-selective metal. In one embodiment, the first material includes a zeolite.

The invention also further includes the step of depositing one or more other materials (e.g., gas-selective materials) on the porous substrate prior to depositing the first material on the porous substrate. For example, one or more ceramics, zeolites, metals, and/or alloys can be deposited on the porous substrate before the first material is deposited on the porous substrate and the coated substrate is formed.

The first material can be deposited onto the porous substrate using any of the techniques known in the art. For example, the first material can be deposited using electroless plating, thermal deposition, chemical vapor deposition, electroplating, spray deposition, sputter coating, e-beam evaporation, ion beam evaporation, or spray pyrolysis. In one embodiment, depositing the first material on the porous substrate includes depositing an alloy on the porous substrate. Depositing an alloy on the porous substrate can include applying at least two metals to the porous substrate and thermally treating the metals to form the alloy. For example, palladium and at least one of the metals selected from the group consisting of copper, silver, gold, platinum, ruthenium, rhodium, yttrium, cerium and indium, can be deposited to the porous substrate and the metals can be thermally treated to form the alloy.

Depositing a first material on the porous substrate can begin the formation of a dense gas-selective membrane. However, deposition of a first material, such as a gas-selective material, can be stopped prior to achieving a dense gas-selective membrane and the product is referred to herein as a "coated substrate." By depositing the first material (e.g., a gas-selective material) on the porous substrate, a portion, a majority, or most of the pores, holes and/or defects present in the substrate can be covered or blocked. In one embodiment, the pores, holes and/or defects of the substrate are substantially covered and/or blocked by plating the porous substrate with a hydrogen-selective metal, thereby forming a coated substrate.

In one embodiment, the first material is deposited to produce a total thickness of material (e.g., zeolite, ceramic and/or metal) on the porous substrate that is less than about 80 percent of the ultimate thickness of the dense gas selective membrane. In some embodiments, the first material is deposited to produce a total thickness of material on the porous substrate that is less than about 60, 50, 40, 30 or less than about 20 percent of the ultimate thickness of the dense gas selective membrane. For example, the first material can be deposited to produce a total thickness of material on the porous substrate that is about 10 to about 60, about 20 to about 50, or about 30 to about 40 percent of the ultimate thickness of the dense gas selective membrane.

The present method for fabricating a composite gas separation module also includes the step of abrading the coated substrate, thereby forming a polished substrate. The coated substrate can be abraded to remove one or more unfavorable morphologies. For example, the coated substrate can be abraded to remove accumulations of the first material such as, for example, dendrites or agglomerations from the surface of the coated substrate. In one embodiment, abrading the coated substrate includes removing a portion of the surface of the coated substrate having a porous morphology.

The inventive method can include abrading a coated substrate following the deposition of multiple layers of zeolites, ceramics and/or metals over the porous substrate. In one embodiment, multiple layers of one or more gas-selective materials are deposited on the porous substrate prior to abrasion of the coated substrate. In an additional embodiment, multiple layers of one or more gas-selective materials and one or more non-gas selective materials are deposited on the porous substrate prior to abrasion of the coated substrate.

In one embodiment, the coated substrate is abraded following an inspection of the coated substrate that indicates the presence of unfavorable morphologies. For example, the inspection can include optical examination (e.g., using an optical microscope), mechanical examination, or any other technique known in the art for assessing the presence of unfavorable morphologies. One or more materials, including the first material, can be deposited on the porous substrate prior to an examination of the coated substrate. Alternatively, the coated substrate can be abraded without confirmation of the presence of unfavorable morphologies.

In one embodiment, the coated substrate is abraded when the thickness of the material(s) deposited on the porous substrate is less than about 80 percent of the ultimate thickness of the dense gas selective membrane. However, the effectiveness of the inventive method for reducing the thickness of a gas separation membrane is diminished when abrasion of the coated substrate occurs when the thickness of the material(s) deposited on the porous substrate is greater than about 60 percent of the ultimate thickness of the dense gas selective membrane. Therefore, in one embodiment, the coated substrate is abraded when the thickness of deposited material(s) (e.g., the first material) is less than about 60 percent of the ultimate thickness of the dense gas selective membrane. For example, the coated substrate can be abraded when the thickness of the deposited material(s) is about 10 to about 60, about 20 to about 50, or about 30 to about 40 percent of the ultimate thickness of the dense gas selective membrane. However, in some embodiments, the coated substrate is abraded when the thickness of deposited material (e.g., the first material) is greater than about 60 percent of the ultimate thickness of the dense gas selective membrane. Abrasion when the thickness of deposited material is greater than about 60 percent can help to produce a membrane that is more gas-selective than membranes formed wherein abrasion is not performed when the thickness of deposited material is greater than about 60 percent. Likewise, it should be noted that abrasion, when the thickness of deposited material is less than about 60 percent, can also help to produce a membrane that is more gas-selective than membranes formed wherein abrasion is not performed.

The coated substrate can be abraded by any technique known in the art for abrading the deposited material(s). For example, the coated substrate can be abraded by machine or by hand. The coated substrate can be abraded using any of a variety of abrasion media including, for example, sand paper such as waterproof sand paper, e.g., TUFBAK GOLD T481 (Norton Abrasives, Worcester, Mass.) or SILICON CARBIDE (Struers, Inc., Westlake, Ohio). In some embodiments, the surface of the polished substrate becomes shiny and/or more uniform following abrasion. In preferred embodiments, when the polished substrate is tested for inert gas flux, the flux of gas is not increased as compared to the coated substrate. In some preferred embodiments, the inert gas flux of the polished substrate is decreased as compared to the coated substrate.

It has been discovered that by abrading a coated substrate and then depositing a second material (e.g., a gas selective material such as a hydrogen-selective metal) on the polished substrate, dense gas-selective membranes can be produced using a smaller quantity of gas-selective material. For example, by removing a portion of a first material having an unfavorable morphology following one or more steps of depositing the first material on a porous substrate, growth of crystals, dendrites and/or agglomerates that is generally perpendicular to the surface can be retarded or substantially eliminated.

Removal of material growing generally perpendicular to the surface of the coated substrate can be accomplished without the substantial removal of portions of the surface of the coated substrate with more favorable morphology or crystal orientation, e.g., parallel to the surface with uniform thickness. It is believed that it is possible to do this because dendrites, agglomerates and/or other features which grow generally normal to the surface of the coated substrate present higher peaks which are removed by abrasion such as, for example, gentle polishing. More favorable morphologies are thought to be minimally impacted by abrasion because they are lower and are thereby allowed to grow parallel to the surface of the substrate in the subsequent deposition of a second material, thereby covering a greater fraction of the surface. As the fraction of the surface of the coated substrate covered by unfavorable morphologies is reduced, the repetition and growth of these unfavorable morphologies can be suppressed or reduced. This can reduce the overall thickness necessary for attainment of a dense gas-selective membrane.

Practice of the present invention can also reduce the thickness of gas-selective material needed to obtain a dense gas-selective membrane by partially or completely covering and/or blocking pores, holes and/or defects in the coated substrate. For example, it has been discovered that abrasion of a coated substrate can reduce the flux of an inert gas through the resulting polished substrate. Even in the absence of unfavorable morphologies, abrasion of the coated substrate can reduce the thickness of gas-selective material needed to obtain a dense gas-selective membrane by partially or completely covering and/or blocking pores, holes and/or defects in the coated substrate. Therefore, in one embodiment, a coated substrate, containing few or no unfavorable morphologies, is abraded prior to deposition of a second material.

The invention can be applied to all processes involving crystal growth on a surface. For example, the invention can be applied to the growth of a thin zeolite film or membrane on a porous substrate. In one embodiment, the composite gas separation modules described herein include a zeolite film or membrane. Zeolite films and membranes typically contain very small pores which allow some molecules to pass through while excluding others. Zeolite films and membranes can also function to separate gases by preferentially adsorbing one or more molecules in the small pores to the exclusion of other molecules. In both cases, zeolite films and membranes useful for composite gas separation modules, like dense gas-selective metal membranes of the present invention, are preferably free of large pores, holes and/or defects and provide a high flux of desired molecules. Therefore, in one embodiment, at least one of the first material and the second material includes a zeolite. For example, in one embodiment, the composite gas separation module includes a dense gas-selective membrane that contains a zeolite film or membrane. In an additional embodiment, the method for fabricating a composite gas separation module includes the step of depositing a hydrogen selective metal on the material that includes a zeolite.

The method of the invention also includes depositing a gas-selective material over the polished substrate. In one embodiment, depositing the second material includes depositing a gas-selective material on the polished substrate in an amount sufficient to form a dense gas-selective membrane. The invention also includes depositing a gas-selective material over the polished substrate (e.g., the gas-selective material is deposited to overlie the polished substrate) in an amount sufficient to form a dense gas-selective membrane. For example, one or more layers of the second material can be deposited on the polished substrate and a gas-selective material can then be deposited over the second material. In another embodiment, one or more layers of another material that is not gas-selective is deposited over the second material prior to deposition of a gas-selective material. In one aspect of the invention, the support is surface activated prior to depositing a gas-selective material (e.g., a hydrogen-selective metal or an alloy thereof) over the polished substrate.

In one embodiment, the dense gas-selective membrane is selectively permeable to hydrogen, e.g., the dense gas-selective membrane is a dense hydrogen-selective metal membrane and can include one or more hydrogen-selective metals or alloys thereof. "Hydrogen-selective metals" include, but are not limited to, niobium (Nb), tantalum (Ta), vanadium (V), palladium (Pd), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen. In one embodiment, a palladium/silver alloy is formed by first depositing palladium onto the substrate by electroless deposition and then depositing silver, also by electroless deposition, onto the substrate. An alloy membrane layer can then be formed by heating the silver and palladium layers, for example, to about 500° C. to about 1000° C. in an inert or hydrogen atmosphere. In one embodiment, metal components can be co-deposited onto the substrate to form a layer of a finely divided mixture of small pockets of the pure metal components. In another embodiment, a technique such as sputtering or chemical vapor deposition is used to simultaneously deposit two or more metals to form an alloy layer on the substrate.

The second material, e.g., a hydrogen-selective metal or alloy thereof, can be deposited onto the polished substrate using any of the techniques known in the art for depositing such materials on a substrate. For example, the second material can be deposited using electroless plating, thermal deposition, chemical vapor deposition, electroplating, spray deposition, sputter coating, e-beam evaporation, ion beam evaporation or spray pyrolysis. In one embodiment, depositing the second material on the polished substrate includes depositing a hydrogen-selective metal on the polished substrate using an electroless plating process. Suitable methods for depositing a hydrogen-selective metal on a substrate are described infra.

The general method of depositing a material (e.g., the first material) on a porous substrate, thereby forming a coated substrate; abrading the coated substrate, thereby forming a polished substrate; and depositing a material (e.g., the second material) on the polished substrate, can be repeated any number of times during fabrication of a composite gas separation module and can be repeated using different or the same materials each time. Thus, the method of fabricating a composite gas separation module can further include the steps of: (a) depositing a third material over the polished substrate (e.g., the third material is deposited to overlie the polished substrate such as by being deposited on the second material), thereby forming a coated polished substrate; (b) abrading the coated polished substrate, thereby forming a newly-polished substrate; and (c) depositing a fourth material on the newly-polished substrate. In one embodiment, at least one of the third material and the fourth material includes a gas-selective material such as a hydrogen-selective metal or an alloy thereof.

In one embodiment, one or more layers of the second material can be deposited on the polished substrate and the third material can then be deposited over the second material, thereby forming a coated polished substrate; the coated polished substrate is abraded, thereby forming a newly-polished substrate; and the fourth material is deposited on the newly-polished substrate. In another embodiment, one or more layers of another material is deposited over the second material prior to deposition of the third material.

The present invention also includes a method for fabricating a plated substrate. The method for fabricating a plated substrate includes the steps of: (a) plating a porous substrate with a first metal, thereby forming a coated substrate; (b) abrading the coated substrate, thereby forming a polished substrate; and (c) plating the polished substrate with a second metal, thereby forming the plated substrate.

In one embodiment, at least one of the first metal and the second metal includes a hydrogen-selective metal or an alloy thereof such as palladium or an alloy thereof. Both the first metal and the second metal can include a hydrogen-selective metal or an alloy thereof. The hydrogen-selective metal(s) can include palladium alloyed with at least one of the metals selected from the group consisting of copper, silver, gold, platinum, ruthenium, rhodium, yttrium, cerium and indium. In a preferred embodiment, plating the polished substrate with the second metal includes forming a dense hydrogen-selective metal membrane. Thus, in one embodiment, the plated substrate can be used to fabricate a composite gas separation module containing a dense hydrogen-selective metal membrane.

In one embodiment, the invention includes a composite gas separation module comprising a porous substrate and a dense gas-selective membrane, e.g., dense hydrogen-selective metal membrane, wherein the thickness of the dense gas-selective membrane is less than about 3 times the diameter of the largest pore of the porous substrate. For example, the thickness of the dense gas-selective membrane can be less than about 2.5, 2, or less than about 1.5 times the diameter of the largest pore of the porous substrate.

The present invention also includes composite gas separation modules formed by the processes described herein. For example, the invention includes a composite gas separation module fabricated by the method comprising the steps of: depositing a first material on a porous substrate, thereby forming a coated substrate; abrading the coated substrate, thereby forming a polished substrate; and depositing a second material on the polished substrate. In one embodiment, at least one of the first material and the second material includes a gas-selective material such as a hydrogen-selective metal or an alloy thereof.

The invention also includes a composite gas separation module comprising a porous substrate and a dense gas-selective membrane wherein the thickness of the dense gas-selective membrane is less than about 3 times the diameter of the largest pore of the porous substrate. While the thickness of the dense gas-selective membrane can depend, among other factors, on the size of the largest pores in the porous substrate, in some embodiments the dense gas-selective membrane is less than about 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

In one aspect, performance of the composite gas separation modules described herein can be assessed by measuring hydrogen flux through the module during operation. For example, hydrogen flux through the composite gas separation modules, in one embodiment, is at least about 4 $Nm^3/m^2$-hr at about 350° C. and with a hydrogen partial pressure difference of about 1 bar.

The composite gas separation modules described herein can further include an intermetallic diffusion barrier, as described infra, wherein the intermetallic diffusion barrier underlies the dense gas-selective membrane and overlies the porous substrate. For example, the intermetallic diffusion barrier can include alternating layers of palladium or an alloy thereof and layers of a Group IB metal, such as silver or copper, or an alloy thereof. The composite gas separation modules can also further include a surface treatment, also described infra, such as a ceramic coating bonded to the porous substrate and underlying the dense gas-selective membrane.

In one aspect, the present invention includes a method for selectively separating hydrogen gas from a hydrogen gas-containing gaseous stream, by which method, hydrogen gas is at least partially partitioned from the gaseous stream by passing through a dense hydrogen-selective membrane. The method includes directing the hydrogen gas-containing gaseous stream to a composite gas separation module; wherein the composite gas separation module includes a porous substrate and a dense hydrogen-selective membrane, and wherein the thickness of the dense hydrogen-selective membrane is less than about 3 times the diameter of the largest pore of the porous substrate.

In one embodiment, a method for selectively separating hydrogen gas from a hydrogen gas-containing gaseous stream can include directing the hydrogen gas-containing gaseous stream to a composite gas separation module formed by the method for fabricating a composite gas separation module described supra. For example, a method for fabricating the composite gas separation module can include the steps of: depositing a hydrogen-selective metal on a porous substrate, thereby forming a coated substrate; abrading the coated substrate, thereby forming a polished substrate; and depositing a hydrogen-selective metal over and/or on the polished substrate. Preferably, the hydrogen-selective metal is palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective metal membrane and thereby separated from the other gases.

Details of specific method steps that can be employed in various embodiments of the invention follow under separate subheadings.

Substrate Surface Treatments

The present method for forming a composite gas separation module can also include surface treating the porous substrate to form an optional intermediate layer prior to depositing the first material on the porous substrate. In one embodiment, the method further includes the step of oxidizing the surface of the porous substrate prior to depositing the first material on the porous substrate. The method can include the step of forming a ceramic coating on the surface of the porous substrate prior to depositing the first material on the porous substrate. In one embodiment, a metal present at the porous substrate surface is oxidized to form an intermediate layer. Thus, the metal present at the substrate surface is transformed into an oxidized state, bonded to the substrate. In another embodiment, a material is deposited on the surface of the porous substrate and is subsequently oxidized prior to depositing the first material on the porous substrate. In other embodiments, a nitride layer can be formed on the surface of the porous substrate prior to depositing the first material on the porous substrate, for example, by oxidizing the substrate in an ammonia-bearing or nitrogen-based atmosphere or a carbide intermediate layer can be formed, for example, by oxidizing the porous substrate in an atmosphere comprising hydrocarbon gases. To enhance the stability of the composite gas separation module, particularly where it will be used at high temperatures, an optional intermediate layer can further include a coating of a second protective layer, such as a layer of alumina, silica, mullite, cordierite, zirconia, titania, tantalum oxide, tungsten or magnesium oxide.

After surface treating the porous substrate to form an optional intermediate layer, the first material, for example, a hydrogen-selective metal such as palladium or an alloy thereof (e.g., a palladium/sliver alloy or a palladium/copper alloy), can be deposited on the porous substrate. Composite gas separation modules having an intermediate layer and methods of surface treating a substrate to form an intermediate layer are described in U.S. Pat. No. 6,152,987 issued on Nov. 28, 2000, to Ma, et al., the entire contents of which is incorporated herein by reference.

Intermetallic Diffusion Barrier

The present method for forming a composite gas separation module can also include forming an intermetallic diffusion barrier on the porous substrate prior to depositing the first material on the porous substrate or on the coated substrate prior to abrading the coated substrate. In one embodiment, forming an intermetallic diffusion barrier (e.g., an oxide layer intermetallic diffusion barrier) includes oxidizing the substrate in situ as described under the heading Substrate Surface Treatments, supra. In another embodiment, an intermetallic diffusion barrier includes one or more layers of deposited metal. For example, applying a porous metal layer intermetallic diffusion barrier can include applying one or more porous layers of metal over the surface of a porous substrate or a coated substrate.

In one embodiment, a porous metal layer intermetallic diffusion barrier includes palladium or an alloy thereof and a Group IB metal, such as copper or silver, or an alloy thereof. For example, the intermetallic diffusion barrier can include alternating porous layers of palladium and a Group IB metal or alloys thereof. Methods for fabricating composite gas separation modules that include intermetallic diffusion barriers are further discussed in U.S. Provisional Patent Application No. 60/457,061, entitled "Method of Making Intermetallic Diffusion Barrier," by Ma, et al., filed on Mar. 21, 2003, and in U.S. patent application Ser. No. 10/804,846, entitled "Composite Gas Separation Modules Having Intermediate Porous Metal Layers," by Ma, et al., filed on even date herewith under, each incorporated by reference herein in their entirety.

Practice of the present invention can help to reduce or prevent the repetition of porous morphology of some intermetallic diffusion barriers (e.g., porous metal layer intermetallic diffusion barriers) in subsequent plating of a support with the first material, e.g., a gas-selective material such as hydrogen-selective metal or an alloy thereof. In one embodiment, a porous metal layer intermetallic diffusion barrier is formed on a porous substrate; the intermetallic diffusion barrier is abraded, thereby forming a polished barrier-containing substrate; and the first material (e.g., a gas-selective material) is deposited on the polished barrier-containing substrate. In another embodiment, an intermetallic diffusion barrier (e.g., a porous metal layer and/or an oxide layer intermetallic diffusion barrier) is formed on a porous substrate; a first material (e.g., a gas-selective material) is deposited on the porous substrate, thereby forming a coated substrate; the coated substrate is abraded, thereby forming a polished substrate; and a second material (e.g., a gas-selective material) is deposited on the polished substrate.

Metal Deposition on the Porous Substrate

The present inventive methods for forming a composite gas separation module can also include depositing a metal selected from the group consisting of palladium, gold and platinum on the porous substrate prior to depositing the first material on the porous substrate. Preferably, this deposit of metal on the porous substrate does not significantly increase the transport resistance of the substrate. In one embodiment, the thickness of this metal deposit is less than about 10, 7, 5, 3, or less than about 1 percent of the ultimate thickness of the dense gas-selective membrane.

This procedure can include surface activating the porous substrate, as described infra, prior to depositing the metal on the porous substrate. This process of depositing a metal selected from the group consisting of palladium, gold and platinum on the porous substrate can help to protect the substrate from post-synthesis corrosion. In one embodiment, the deposition of palladium, gold and/or platinum on the porous substrate is made following formation of an intermetallic diffusion barrier such as an oxide layer intermetallic diffusion barrier, described supra. The deposition of palladium, gold and/or platinum can also be made prior to formation of an intermetallic diffusion barrier such as the porous metal layer intermetallic diffusion barrier described supra.

In one embodiment, a small quantity of the metal, sufficient to cover the pore walls of the substrate, is deposited on the porous substrate without a significant reduction of the substrate porosity. Typically, the deposition of palladium, gold and/or platinum on the porous substrate is made by surface activating and plating on the side of the substrate opposite to the side on which a gas-selective membrane will be formed. For example, in one embodiment, a deposit of palladium, gold and/or platinum is formed from the inside of a substrate tube (e.g., using an electroless plating solution) and a dense gas-selective membrane is subsequently formed on the outside of the substrate tube.

Surface Activation

The present method for forming a composite gas separation module can include surface activating a support prior to deposition of a desired material (e.g., the first, second, third, fourth materials, an intermetallic diffusion barrier component or a metal deposited on the porous substrate). For example, a porous substrate can be surface activated prior to depositing a hydrogen-selective metal or alloy thereof on the support.

In one embodiment, surface activation includes seeding the surface of the support with nuclei of a hydrogen-selective metal such as with palladium nuclei. Without wishing to be held to any particular theory, it is believed that when a surface activated support is electrolessly plated, the palladium nuclei on the surface activated substrate initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in the aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure, and thickness of this layer can depend on factors such as the ratio of hydrochloride to stannous chloride, the structure, roughness and shape of the support surface, and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without surface activation of the support. However, absent surface activation, plating of the support with the metal can be slow.

Metal Deposition

Deposition of a material on a support can include plating the support with a metal (e.g., a hydrogen-selective metal). For example, depositing a metal on a support, such as depositing a metal on a polished substrate, depositing a metal on a porous substrate and/or forming a porous metal layer intermetallic diffusion barrier, can employ an electroless plating technique such as the method that follows.

In one embodiment, plating is conducted by electroless plating. For example, palladium deposition can occur according to the autocatalytic reactions of Chemical Equations I and II:

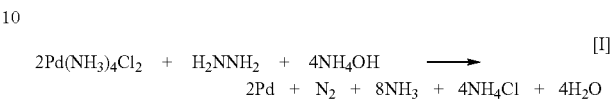

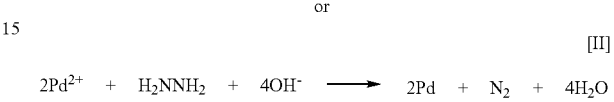

In one embodiment, a plating solution is prepared that contains the following: 4.0 g/L $Pd(NH_3)_4Cl_2 \cdot H_2O$; 198 mL/L $NH_4OH$ (28%); 40.1 g/L $Na_2EDTA$; and 5.6-7.6 mL/L $H_2NNH_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 $cm^3$ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine ($H_2NNH_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

As alternatives to electroless plating, a metal, e.g., palladium, can be deposited on the support by other suitable metal deposition techniques known in the art, such as thermal deposition, chemical vapor deposition, electroplating, spray deposition, sputter coating, e-beam evaporation, ion beam evaporation, or spray pyrolysis. Metal deposition on the porous substrate, described supra, and/or formation of an intermetallic diffusion barrier can also employ these other suitable metal deposition techniques.

Selective Plating

In one embodiment, the present invention can further include selectively surface activating a support proximate to a defect and preferentially depositing a material on the selectively surface activated portion of the support. For example, the porous substrate or the polished substrate can be selectively plated with a hydrogen-selective metal (or an alloy thereof) prior to or following deposition of the first or second materials on the porous substrate or on the polished substrate, respectively. In one embodiment, the coated substrate is selectively plated with a hydrogen-selective metal or an alloy thereof prior to abrasion of the coated substrate. In one embodiment, wherein depositing the second material includes depositing a gas-selective material on the polished substrate in an amount sufficient to form a dense gas-selective membrane, the step of depositing the second material can include selectively plating the support with a hydrogen-selective metal or an alloy thereof.

Methods for fabricating gas separation modules that include selectively surface activating a support proximate to a defect and preferentially depositing a material on the selectively surface activated portion of the support are discussed in U.S. Provisional Patent Application No. 60/456,931, entitled "Method of Producing Thin Palladium and Palladium Alloy Layers," by Ma, et al., filed on Mar. 21, 2003, and in "Method for Curing Defects in the Fabrication of a Composite Gas Separation Module," by Ma, et al., filed on even date herewith under, each incorporated by reference herein in their entirety.

Reacting Chloride to Form Phosphate

The surface activated support, the coated substrate, the polished substrate, or other intermediate products described herein can contain chloride anions. Residual metal chlorides, resulting from surface activation or electroless plating steps, can remain in the pores of the support. In one embodiment, the invention includes removing residual metal chlorides, for example, by treatment with an aqueous phosphoric acid solution, e.g., 10% phosphoric acid solution. For example, the treatment can include application of 10% phosphoric acid solution at room temperature for a time sufficient to convert residual metal chlorides to metal phosphates, e.g., about 30 minutes, followed by appropriate rinsing and drying, e.g., rinsing with deionized water for about 30 minutes and drying at about 120° C. for at least about 2 hours.

Therefore, the present method for forming a composite gas separation module can further comprise the step of reacting chloride anions to form metal phosphates. For example, residual metal chlorides can be removed between depositions of dense gas-selective membrane components such as plating the porous substrate with a hydrogen-selective metal or metal plating of the polished substrate. Treatment with an aqueous phosphoric acid solution can promote exchange of chloride anions to form insoluble metal phosphates. The removal of metal chlorides from the pores can reduce or substantially eliminate corrosion of the support during subsequent plating steps and post-synthesis. In addition, the formed metal phosphates can be more stable than metal chlorides in a dense hydrogen-selective metal membrane at high temperatures. This method can retard the formation of metal chlorides in the support as well as retard the formation of metal chlorides used in electroless plating solutions and activation compositions.

Composite gas separation modules and methods for their fabrication suitable for use in conjunction with the present invention are described in U.S. Pat. No. 6,152,987, cited supra, and also in U.S. Provisional Patent Application No. 60/456,931, cited supra; U.S. Provisional Patent Application No. 60/457,061, cited supra; U.S. Provisional Patent Application No. 60/456,930, entitled "Method for Producing Dense Selective Layers," by Ma, et al., filed on Mar. 21, 2003; U.S. Provisional Patent Application No. 60/467,493, entitled "High Melting Point Metal Diffusion Barriers for Composite Palladium Porous Stainless Steel Membranes," by Ma, et al., filed on May 2, 2003; U.S. patent application Ser. No. 10/804,848, entitled "Method for Curing Defects in the Fabrication of a Composite Gas Separation Module," by Ma, et al., cited supra; and U.S. patent application Ser. No. 10/804,846, entitled "Composite Gas Separation Modules Having Intermediate Porous Metal Layers," by Ma, et al., cited supra, each of which is incorporated herein by reference in its entirety.

EXEMPLIFICATION

The invention will now be further and specifically described by the following examples which are not intended to be limiting.

Example 1

This example describes the fabrication of a composite structure that includes palladium and a 0.1 micron grade porous 316L stainless steel (PSS) support.

A 6 inch long, 0.5 inch outside diameter (OD) section of PSS tube, welded to sections of 0.5 inch OD dense 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol.

The support was oxidized in air at 400° C. for 6 hours wherein the rates of heating and cooling was 3° C. per minute. Following oxidation, helium permeation through the support was measured at a rate of 170 normal cubic meters per square meter per hour (reference temperature=0° C., reference pressure=1 atmosphere) ($Nm^3/m^2$-hr) at a pressure difference of 1 atm and a temperature of 20° C. (prior to oxidation, the rate of helium permeation through the support was 171 $Nm^3/m^2$-hr). Subsequent helium permeation measurements were made under the same conditions.

The oxidized tube was then surface activated by sequentially immersing the tube in aqueous baths of $SnCl_2$ and $PdCl_2$. The tube was immersed in 500 mL of aqueous $SnCl_2$ (1 g/L) at 20° C. for about 5 minutes and was subsequently rinsed with deionized water. The tube was then immersed in 500 mL of aqueous $PdCl_2$ (0.1 g/L) at 20° C. for about 5 minutes followed by rinsing first with 0.01 molar hydrochloric acid and then with deionized water. The above described surface activation cycle was performed a total of five times followed by drying for 2 hours at 120° C.

Palladium was deposited on the tube by electroless plating according to the following procedure. The tube was immersed in a plating solution at room temperature. The plating solution was composed of 4 grams $Pd(NH_3)_4Cl_2 \cdot H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were then placed in a water bath at 60° C. for 90 minutes. The tube was then removed from the plating solution and was rinsed with deionized water at 60° C. This above-described cycle was repeated by immersing the tube in a fresh plating solution, placing the plating solution and tube in a water bath for 90 minutes, and rinsing the tube. This cycle was then repeated two additional times for a total plating time of 6 hours (4-90 minute cycles). The tube was then dried at 120° C. for about 2 hours. The palladium thickness, determined gravimetrically, was 5 microns and the helium permeation rate was 145 $Nm^3/m^2$-hr.

The membrane was polished with waterproof sand paper, TUFBAK GOLD T481 (Norton Abrasives, Worcester, Mass.), with grit 600 to obtain a metal color. Subsequently, the membrane was polished with waterproof sand paper, SILICON CARBIDE (Struers, Inc., Westlake, Ohio), with grit 1200 to remove scratches. In both instances, polishing was performed dry and by hand. The tube was then rinsed in isopropanol, and placed in an ultrasonic bath with acetone for 15 minutes. The membrane was dried at 120° C. for at least 2 hours. The thickness of the resulting palladium layer was 4.6 microns (determined gravimetrically) and helium permeation rate was 129 Nm³/m²-hr. The reduction in the helium permeation rate after polishing showed that the membrane was undamaged by the treatment.

The membrane was then surface activated, as described above, by repeating the surface activation cycle three times. Palladium was then deposited on the tube by electroless plating according to the above-described procedure three times for 90 minutes each time (a total of 4.5 hours). Between each of the 90 minute platings, the membrane was rinsed with deionized water (at 60° C.) not less than three times, and the plating solution was replaced with fresh plating solution. The total thickness of palladium was then 8.5 microns (determined gravimetrically) and the helium permeation rate was 0.829 Nm³/m²-hr.

The membrane was polished again with waterproof sand paper, SILICON CARBIDE (Struers, Inc., Westlake, Ohio), with grit 1200. Following polishing, the membrane was rinsed in isopropanol and dried as before. The thickness of the resulting palladium layer was 7.9 microns (determined gravimetrically) and the helium permeation rate was 0.366 Nm³/m²-hr. The membrane was again surface activated as described above by repeating the surface activation cycle three times. Palladium was then deposited on the tube by electroless plating according to the above-described procedure using three 90 minute platings, thereby plating an additional 1.53 microns of palladium (determined gravimetrically). The total thickness of the palladium layer was then 9.4 microns and helium permeation rate was 0.003 Nm³/m²-hr. The membrane was once again surface activated as described above by repeating the surface activation cycle three times. 2.3 microns of palladium (determined gravimetrically) was then deposited on the tube according to the above-described procedure. The final, total thickness of palladium was 11.7 microns and the helium permeation rate was too small to measure.

Example 2

This example describes the fabrication of a composite structure that includes palladium, a porous metal layer intermetallic diffusion barrier, and a 0.1 micron grade porous HASTELLOY® C-22® support. (HASTELLOY® C-22® is a nickel-chromium-molybdenum-iron-tungsten alloy.)

A 31.3 inch long, 1 inch O.D., section of porous HASTELLOY® C-22® tube, welded to sections of 1 inch O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water, and isopropanol.

The tube was oxidized in static air at 600° C. for 12 hours. The rate of heating and cooling was 3° C. per minute. Following oxidation, helium flux through the support was measured to be 16.0 Nm³/m²-hr at a pressure difference of 1 atm and a temperature of 20° C. Subsequent helium flux measurements were made under the same conditions.

The oxidized tube was then surface activated by sequentially immersing the tube in baths of $SnCl_2$ and $PdCl_2$. The tube was immersed in 3.5 L of aqueous $SnCl_2$ (1 g/L) at 20° C. for about 5 minutes and was subsequently rinsed with deionized water. The tube was then immersed in 3.5 L of aqueous $PdCl_2$ (0.1 g/L) at 20° C. for about 5 minutes followed by rinsing first with 0.01 molar hydrochloric acid and then with deionized water. The above-described surface activation cycle was performed a total of six times followed by drying overnight at 120° C.

A porous palladium-silver intermetallic diffusion barrier was then applied to the surface activated tube. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4Cl_2 \cdot H_2O$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. The plating solution was composed of 0.519 grams $AgNO_3$/liter, 198 milliliters $NH_4OH$ (28 weight percent)/liter, 40.1 grams $Na_2EDTA$/liter, and 6 milliliters $H_2NNH_2$ (1 M)/liter. The plating solution and tube were placed in a water bath at 60° C. After the plating solution was depleted, the tube was removed and rinsed with deionized water at 60° C. with 4 to 5 rinses.

Each metallic layer was applied by contacting the tube with a plating solution for 90 minutes and was followed by rinsing the tube with deionized water, but not with intermediate activation, drying or sintering. The specific layers, an estimate of the layer thicknesses, and the order of their application were Pd (about 1.5 microns), Ag (about 0.3 microns), Pd (about 1 micron), Ag (about 0.3 microns), and Pd (about 1.5 microns). (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.)

After applying the above-described palladium and silver layers, the membrane was dried at 120° C. for about 48 hours. The membrane was then lightly brushed with a fine artist's paint brush. Following this, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. The membrane was then plated with another consecutive sequence of Pd/Ag/Pd/Ag/Pd layers, as described above. The membrane was subsequently dried at 120° C. overnight.

The dried membrane was then lightly brushed with a fine artist's paint brush. After this brushing, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. The membrane was then plated with palladium for another 450 minutes. During this palladium plating, the plating solution was changed every 90 minutes. The membrane was rinsed each time the solution was changed with deionized water at 60° C. The membrane was not surface activated between these solution changes. The resulting membrane was dried at 120° C. overnight. The membrane had a total plated thickness of 14.23 microns and a high helium flux of 12.2 Nm³/m²-hr, indicating that the deposited layers were porous.

The surface of the deposited membrane was then abraded by hand using 600 grit dry sandpaper (TUFBAK GOLD T481; Norton Abrasives, Worcester, Mass.). Following abrasion, the membrane was cleaned in an ultrasonic bath of isopropyl alcohol. The membrane was then dried at room temperature under flowing helium. This polishing treatment reduced the total thickness of the membrane to 13.93 microns (determined gravimetrically). The helium flux of the membrane decreased to 10.9 $Nm^3/m^2$-hr.

The membrane was finished by performing 4 palladium plating cycles, each 450 minutes in duration. For each cycle the following steps were performed. First, the entire plated surface of the tube was dipped in 0.1M HCl for 60 seconds at room temperature. It was then rinsed with deionized water at room temperature. Following this, the membrane was surface activated by repeating the surface activation cycle, described supra, three times. The membrane was then dried at 120° C. overnight. Next, the membrane was plated with palladium for 450 minutes. During this palladium plating, the plating solution was changed every 90 minutes. The membrane was rinsed each time the solution was changed with deionized water at 60° C. The membrane was not surface activated between these plating solution changes. The resulting membrane was dried at 120° C. overnight.

Based on gravimetric data, the total palladium and silver thickness of the finished membrane was 33 microns. The membrane had a helium flux of 0.0012 $Nm^3/m^2$-hr. The hydrogen permeance of the membrane reached a stable value of 14 $Nm^3/m^2$-hr over a four day test at 500° C.

While this invention has been particularly shown and described with references to preferred embodiments thereof, it will be understood by those skilled in the art that various changes in form and details may be made therein without departing from the scope of the invention encompassed by the appended claims.

We claim:

1. A method for fabricating a composite gas separation module, comprising the steps of:
   a) depositing a first material on a porous substrate, thereby forming a coated substrate;
   b) abrading the coated substrate, thereby forming a polished substrate; and
   c) depositing a second material on the polished substrate; wherein the first material and the second material each include a gas-selective material.

2. The method of claim 1 wherein abrading the coated substrate includes removing a portion of the first material from the coated substrate.

3. The method of claim 2 wherein abrading the coated substrate includes removing dendrites or agglomerations of the first material from the coated substrate.

4. The method of claim 1 wherein the gas-selective material is a hydrogen-selective metal or an alloy thereof.

5. The method of claim 4 wherein the hydrogen-selective metal is palladium or an alloy thereof.

6. The method of claim 5 wherein the hydrogen-selective metal is palladium alloyed with at least one of the metals selected from the group consisting of copper, silver, gold, platinum, ruthenium, rhodium, yttrium, cerium and indium.

7. The method of claim 1 wherein depositing the first material on the porous substrate or depositing the second material on the polished substrate includes depositing an alloy on the porous substrate or on the polished substrate, respectively, and wherein depositing an alloy includes applying at least two metals to the porous substrate or to the polished substrate and thermally treating the metals to form the alloy.

8. The method of claim 1 wherein at least one of the first material and the second material includes a zeolite.

9. The method of claim 8 further including the step of depositing a hydrogen-selective metal on the material that includes a zeolite.

10. The method of claim 1 further including the step of surface activating the porous substrate prior to depositing the first material.

11. The method of claim 1 further including the step of depositing palladium or gold on the porous substrate prior to depositing the first material.

12. The method of claim 1 further including the step of forming an intermetallic diffusion barrier on the porous substrate prior to depositing the first material.

13. The method of claim 12 wherein forming an intermetallic diffusion barrier on the porous substrate includes forming a ceramic coating on the surface of the porous substrate.

14. The method of claim 1 wherein depositing at least one of the first material and the second material on the porous substrate or the polished substrate, respectively, includes depositing the material by a method selected from the group consisting of electroless plating, electroplating, thermal deposition, chemical vapor deposition, spray deposition, sputter coating, e-beam evaporation, ion beam evaporation and spray pyrolysis.

15. The method of claim 1 further including the step of surface activating the polished substrate prior to depositing the second material.

16. The method of claim 1 further including the steps of:
   a) depositing a third material over the polished substrate, thereby forming a coated polished substrate;
   b) abrading the coated polished substrate, thereby forming a newly-polished substrate; and
   c) depositing a fourth material on the newly-polished substrate.

17. The method of claim 16 wherein at least one of the third material and the fourth material includes a gas-selective material.

18. The method of claim 1 further including the step of forming a dense gas-selective membrane over the porous substrate.

19. The method of claim 18 wherein the dense gas-selective membrane includes palladium or an alloy thereof.

20. The method of claim 18 wherein depositing the second material includes depositing a gas-selective material on the polished substrate in an amount sufficient to form a dense gas-selective membrane.

21. The method of claim 1 wherein the porous substrate is a porous metal substrate.

22. The method of claim 21 wherein the porous metal substrate is an alloy containing chromium and nickel.

23. The method of claim 22 wherein the alloy further contains molybdenum.

24. The method of claim 21 wherein the porous metal substrate is stainless steel.

25. The method of claim 1 wherein the porous substrate is a porous ceramic substrate.

26. A method for fabricating a plated substrate, comprising the steps of:
   a) plating a porous substrate with a first hydrogen-selective metal or an alloy thereof, thereby forming a coated substrate;
   b) abrading the coated substrate, thereby forming a polished substrate; and
   c) plating the polished substrate with a second hydrogen-selective metal or an alloy thereof, thereby forming the plated substrate.

27. The method of claim 26 wherein the first hydrogen-selective metal is palladium.

28. The method of claim 27 wherein the alloy of the hydrogen-selective metal is palladium alloyed with at least one of the metals selected from the group consisting of copper, silver, gold, platinum, ruthenium, rhodium, yttrium, cerium and indium.

29. The method of claim 26 wherein the second hydrogen-selective metal is palladium.

30. The method of claim 26 wherein plating the polished substrate with the second hydrogen-selective metal includes forming a dense hydrogen-selective metal membrane.

* * * * *